United States Patent

Mueller et al.

[15] 3,696,155

[45] Oct. 3, 1972

[54] PRODUCTION OF 2-METHYL-3-BUTEN-2-OL

[72] Inventors: Herbert Mueller, 53 Carostrasse, 6710 Frankenthal; Dietrich Mangold, 49 Hermann-Walker-Strasse, 6903 Neckargemuend, both of Germany

[22] Filed: May 13, 1970

[21] Appl. No.: 37,061

[30] Foreign Application Priority Data

May 17, 1969 Germany ..........P 19 25 197.9

[52] U.S. Cl..................................260/642, 260/682
[51] Int. Cl..........................C07c 29/00, C07c 1/24
[58] Field of Search.......................................260/642

[56] References Cited

UNITED STATES PATENTS 3,344,191  9/1967  Chappell et al............260/642
2,373,956  4/1945  Hearne et al..............260/642
2,435,078  1/1948  Hearne et al..............260/642

OTHER PUBLICATIONS

Nazarov et al., " Chem. Abstracts" , Vol. 42, (1948), pages 7730 to 7739, QDIA5/.
Nazarov et al., Akad Nask 555R Seris Khim, (1946) pages 4-19-26, Library Congress No. AS262. A 62425.

*Primary Examiner*—Leon Zitver
*Assistant Examiner*—Joseph E. Evans
*Attorney*—Johnston, Root, O'Keeffe, Keil, Thompson and Shurtleff

[57] ABSTRACT

Production of 2-methyl-3-buten-2-ol in which an aqueous acid is allowed to act on 3-methyl-3-buten-1-ol at temperatures of from 20° to 250°C while removing by distillation the 2-methyl-3-buten-2-ol formed. 2-methyl-3-buten-2-ol is an important intermediate for the production of terpenes.

6 Claims, No Drawings

PRODUCTION OF 2-METHYL-3-BUTEN-2-OL

The present invention relates to a process for the production of 2-methyl-3-buten-2-ol by isomerization of 3-methyl-3-buten-1-ol.

It is known that 2-methyl-3-buten-2-ol can be prepared by reaction of acetone with acetylene followed by partial hydrogenation of the resultant 2-methyl-3-buten-1-ol (cf. for example Liebigs Annalen der Chemie, 596, 37(1955). The process is very expensive however because in the first stage special precautionary measures are necessary because acetylene is being used and in the second stage the partial hydrogenation using poisoned catalysts requires very exact maintenance of the reaction conditions. The production of 2-methyl-3-buten-2-ol by adding isopropanol radicals to acetylone at superatmospheric pressure is furthermore described in French Pat. No. 1,301,882. This process however gives only unsatisfactory yields.

The object of the invention is a process for the production of 2-methyl-3-buten-2-ol according to which 2-methyl-3-buten-2-ol is obtained by a simpler method and in better yields than in the prior art methods.

In accordance with this invention this and other objects and advantages are obtained in a process for the production of 2-methyl-3-buten-2-ol in which 3-methyl-3-buten-1-ol is contacted with an aqueous acid at a temperature of from 20° to 250°C while removing by distillation the 2-methyl-3-buten-2-ol formed.

According to this process, 2-methyl-3-buten-2-ol is obtained in one stage in good yields. The starting material (3-methyl-3-buten-1-ol) can be prepared in a simple manner by the method of German Printed application No. 1,275,049 by reaction of isobutylene with formaldehyde.

The reaction may be carried out in he presence of a monobasic or polybasic, preferably up to dibasic, organic or inorganic acid. The aqueous acid generally has a dissociation constant of at least $1 \times 10^{-5}$. Naturally compounds which are converted in aqueous medium into acids such as aluminum chloride may also be used. Examples of suitable acids are hydrogen chloride, hydrogen bromide, hydrogen iodide, hydrogen fluoride, sulfuric acid, phosphoric acid, p-toluenesulfonic acid, trichloroacetic acid, dichloroacetic acid, chloroacetic acid, formic acid, oxalic acid, and ion exchange resins which contain sulfonic acid groups or carboxyl groups. The concentration of the aqueous acid is generally from 0.01 to 35 percent by weight. Very strong acids, i.e., acids having a dissociation constant of more than about $10^{-1}$, are advantageously used in a concentration of 0.01 to 10 percent by weight, particularly from 0.05 to 2 percent by weight. Acids having a dissociation constant of less than about $10^{-1}$ are preferably used in amounts of from 0.5 to 25 percent by weight, particularly 1 to 10 percent, by weight. It is generally advantageous to use lower concentrations of acid when using higher temperatures and to use higher acid concentrations at lower temperatures. Thus it may for example be advantageous to decrease the acid concentration by about the factor 0.2 to 0.1 upon an increase in temperature of for example 30°C. Particularly favorable results are obtained when using benzene sulfonic acids, trichloroacetic acid and particularly oxalic acid or maleic acid.

The reaction is carried out at a temperature of from 20° to 250°C, preferably at from 50° to 200°C. Atmospheric pressure is generally used. It is also possible however to use superatmospheric pressure, for example 5 atmospheres, or subatmospheric pressure, for example 100 mm Hg.

The ratio by weight of starting material to aqueous acid is generally from 1:5 to 5:1, preferably from 1:2 to 3:1. It may be advantageous additionally to use inert organic solvents in the isomerization. Examples of suitable solvents are aromatic or aliphatic hydrocarbons which may be nitrated or halogenated such as benzene, toluene, ethylbenzene, chlorobenzene, cyclohexane, ligroin, and trichloroethane. The inert solvents are advantageously used in amounts of 10 to 200 percent by weight, preferably 30 to 80 percent by weight, with reference to the mixture of starting material and aqueous acid. When using an inert solvent it is advantageous to provide for vigorous mixing of the reaction mixture.

The isomerization may be carried out continuously or batchwise. Batchwise operation may be carried out for example by heating a mixture of starting material and aqueous acid in the specified amounts in a reactor having a superimposed packed column at atmospheric pressure at the reaction temperature, the 2-methyl-3-buten-2-ol formed being taken overhead. Water generally is distilled off from the reaction mixture together with the end product. Water is advantageously added to the reaction mixture at the rate at which it is distilled off. It is preferred to carry out the reaction continuously.

2-methyl-3-buten-2-ol is a valuable intermediate for example for the production of terpenes.

The following Examples illustrate the invention. The parts specified in the Examples are parts by weight.

EXAMPLE 1

Six hundred and seventy parts of 3-methyl-3-buten-1-ol, 535 parts of water and 1.67 parts of concentrated sulfuric acid are heated at boiling temperature for 10 hours in a 2-liter stirred flask having a superposed column having a height of 1 meter which is packed with glass Raschig rings and provided with a distilling head. During this period, at a distillation temperature of 94° to 95°C, water (which is continuously returned to the still) and 660 parts of an organic distillate are taken off; the latter has the following composition according to gas chromatographic analysis: 6 percent isoprene, 31.8 percent 2-methyl-3-buten-2-ol and 57.6 percent 3-methyl-3-buten-1-ol. At a conversion of 43 percent, the yield of 2-methyl-3-buten-2-ol is 72 percent of the theory.

EXAMPLE 2

One thousand parts of 3-methyl-3-buten-1-ol, 400 parts of water and 2.5 parts of concentrated phosphoric acid are kept at boiling temperature for 20 hours in the apparatus described in Example 1 in the manner described in Example 1. During this period, 878 parts of an organic distillate is obtained which distils at 85° to 90°C and which according to gas chromatographic analysis has the following composition:- 2.5 percent isoprene, 5 percent 2-methl-3-buten-2-ol and 88 percent 3-methyl-3-buten-1-ol. At a conversion of 10 percent, the yield of 2-methyl-3-buten-2-ol is 45 percent of the theory.

EXAMPLE 3

Fifteen hundred parts of 3-methyl-3-buten-1-ol, 300 parts of water, 2.5 parts of concentrated sulfuric acid and 500 parts of ethylbenzene are heated at boiling temperature for 20 hours with vigorous stirring in the apparatus described in Example 1 and by an analogous method to that described in Example 1. The 999 parts of distillate obtained contains the following substances according to gas chromatographic analysis: 7.2 percent isoprene, 14.4 percent 2-methyl-3-buten-2-ol and 27 percent 3-methyl-3-buten-1ol. At a conversion of 46 percent, the yield of 2-methyl-3-buten-2-ol is 63 percent of the theory.

EXAMPLE 4

One thousand parts of 3-methyl-3-buten-1-ol, 400 parts of water and 80 parts of oxalic acid are kept at boiling temperature for 18 hours in a manner analogous to that described in Example 1. During the said period, 912 parts of an organic distillate is obtained which according to gas chromatographic analysis has the following composition: 10.5 percent isoprene, 65 percent 2-methyl-3-buten-2-ol and 23 percent 3-methyl-3-buten-1-ol. At a conversion of 79 percent, the yield of 2-methyl-3-buten-2-ol is 75 percent of the theory.

By proceeding as described in Example 4 and using 90 parts of maleic acid instead of the oxalic acid, the conversion is 68 percent and the yield of 2-methyl-3-buten-1-ol is 82 percent.

EXAMPLE 5

The evaporator (having a capacity of about 1000 parts by volume) of a distillation column having about ten theoretical trays is fed each hour as follows:-

| | |
|---|---|
| 3-methyl-3-buten-1-ol | 45.5 parts |
| water | 54.5 parts |
| oxalic acid. | 4.5 parts |

The feed temperature is 100°C. A mixture of water and pentenols boiling at 92°C is taken overhead. While the aqueous phase is returned to the evaporator of the column, the organic phase is supplied in the middle of a second column having eight theoretical trays. 0.8 part of isoprene (boiling point 34°C) is taken off at the top of this column. The bottoms of the column is introduced into the lower third of a third column having about 15 theoretical trays. The overhead product obtained here is a 2-methyl-3-buten-2-ol/water azeotrope having a boiling point of 86°C. The bottoms of this column are returned to column 1. The product leaving the evaporator of column 1 and consisting of water, oxalic acid and small amounts of 3-methyl-3-buten-1-ol is returned to the reaction after appropriate con-centration. Whereas 25.7 parts of 2-methyl-3-buten-2-ol is obtained in the overhead product of the third column, 15.9 parts of 3-methyl-3-buten-1-ol is discharged in the bottoms of the first column (gas chromatographic analysis). At a conversion of 65 percent, there is a yield of 2-methyl-3-buten-2-ol of 87 percent of the theory.

EXAMPLE 6

The procedure of Example 5 is followed but a pressure of 2 atmospheres gauge is used in the first column and a 0.5 percent by weight aqueous oxalic acid is used. The top temperature of the first column is 127°C. The mixture of isoprene, water and the pentenols obtained from this column is separated by distillation in two successive columns at atmospheric pressure as described in Example 5. At a conversion of 69 percent, 2-methyl-3-buten-2-ol is obtained in an 85 percent yield.

We claim:

1. A process for the production of 2-methyl-3-buten-2-ol wherein 3-methyl-3-buten-1-ol is 35to a temperature of from 50° to 250° C in the presence of an aqueous acid having a concentration of 0.01 to 35% by weight and a dissociation constant of at least $1 \times 10^{-5}$, the ratio by weight of starting materials to aqueous acid being from 1:5 to 5:1 while removing by distillation the 2-methyl-3-buten-2-ol formed.

2. A process as claimed in claim 1 wherein aqueous oxalic acid is used.

3. A process as claimed in claim 1 wherein aqueous maleic acid is used.

4. A process as in claim 1 wherein the 3-methyl-3-buten-1-ol is heated in the presence of 0.01 to 10 percent by weight of an aqueous acid having a dissociation constant of more than about $10^{-1}$.

5. A process as in claim 1 wherein the 3-methyl-3-buten-1-ol is heated in the presence of 0.5 to 25 percent weight of an aqueous acid having a dissociation constant of less than about $10^{-1}$.

6. A process as in claim 5 wherein from 1 to 10 percent by weight of said acid is present.

* * * * *

PO-1050
(5/69)

UNITED STATES PATENT OFFICE
CERTIFICATE OF CORRECTION

Patent No. 3,696,155      Dated October 3, 1972

Inventor(s) Herbert Mueller, Dietrich Mangold

It is certified that error appears in the above-identified patent and that said Letters Patent are hereby corrected as shown below:

Cover Page, left hand column, insert -- [73] ASSIGNEE: Badische Anilin &- Soda- Fabrik Aktiengesellschaft, Ludwigshafen am Rhein, Germany --

Column 4, line 27 "35" should read -- heated --
Specification-Amendment A Claim 1

Signed and sealed this 3rd day of April 1973.

(SEAL)
Attest:

EDWARD M. FLETCHER, JR.
Attesting Officer

ROBERT GOTTSCHALK
Commissioner of Patents